(12) United States Patent
Kim et al.

(10) Patent No.: US 6,799,849 B2
(45) Date of Patent: Oct. 5, 2004

(54) ILLUMINATION SYSTEM AND PROJECTOR ADOPTING THE SAME

(75) Inventors: Sung-ha Kim, Gyeonggi-do (KR); Kirill Sergeevich Sokolov, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 6 days.

(21) Appl. No.: 10/267,587

(22) Filed: Oct. 10, 2002

(65) Prior Publication Data

US 2004/0012831 A1 Jan. 22, 2004

(30) Foreign Application Priority Data

Oct. 12, 2001 (KR) .......................................... 2001-62936

(51) Int. Cl.[7] .................... G03B 21/26; G03B 21/28; G02B 5/32; F21S 15/00; F21V 11/00
(52) U.S. Cl. ............................ 353/30; 353/37; 359/15; 362/237
(58) Field of Search ............................. 353/20, 30, 31, 353/34, 37, 38; 349/61, 62; 362/237, 257, 19, 800, 555; 359/15

(56) References Cited

U.S. PATENT DOCUMENTS

| | | | | |
|---|---|---|---|---|
| 6,052,229 A | * | 4/2000 | Kim ............................. | 353/31 |
| 6,195,136 B1 | * | 2/2001 | Handschy et al. ............. | 349/5 |
| 6,204,973 B1 | * | 3/2001 | Holden ......................... | 353/10 |
| 6,412,953 B1 | * | 7/2002 | Tiao et al. ..................... | 353/98 |
| 6,631,993 B2 | * | 10/2003 | Fielding ....................... | 353/31 |
| 6,678,078 B1 | * | 1/2004 | Popovich et al. ............. | 359/15 |
| 6,705,730 B2 | * | 3/2004 | Ohshima et al. .............. | 353/31 |

* cited by examiner

*Primary Examiner*—Christopher Mahoney
(74) *Attorney, Agent, or Firm*—Staas & Halsey LLP

(57) ABSTRACT

An illumination system includes an illumination unit having at least one light emitting device which emits a light beam of a predetermined wavelength and at least one holographic optical element which reduces a cross section of the light beam emitted from the light emitting device, and an optical path changer which changes a proceeding path of an incident light passing through the holographic optical element. A projector includes at least one illumination unit having at least one light emitting device which emits a light beam of a predetermined wavelength and at least one holographic optical element which reduces a cross section of the light beam emitted from the light emitting device, an optical path changer which changes a proceeding path of an incident light input through the holographic optical element, a display device which forms an image by processing a light beam input from the optical path changer according to an image signal, and a projection lens unit which magnifies the image formed by the display device and projects the magnified image toward a screen.

60 Claims, 8 Drawing Sheets

ILLUMINATION SYSTEM AND PROJECTOR ADOPTING THE SAME

CROSS-REFERENCE TO RELATED APPLICATIONS

This application claims the benefit of Korean Patent Application No. 2001-62936 filed on Oct. 12, 2001, in the Korean Intellectual Property Office, the disclosure of which is incorporated herein by reference.

BACKGROUND OF THE INVENTION

1. Field of the Invention

The present invention relates to an illumination system and a projector adopting the same, and more particularly, to an illumination system which realizes a color image without a color wheel, and a projector adopting the illumination system.

2. Description of the Related Art

FIG. 1 shows a conventional projector comprising a light source 100, a first relay lens 102 which condenses a light beam emitted from the light source 100, a color wheel 105 which splits an incident light beam into R, G and B color light beams, a fly eye lens 107 which makes the light beam passing through the color wheel 105 uniform, a second relay lens 110 which condenses the light beam passing through the fly eye lens 107, a display device 112 which forms a color image from the R, G and B color light beams sequentially input through the color wheel 105, and a projection lens system 115 which magnifies and projects an image formed by the display device 112 toward a screen 118.

Generally, a xenon lamp, a metal-halide lamp, or a UHP lamp is used as the light source 100. These lamps unnecessarily emit a large amount of an infrared ray and an ultraviolet ray. Accordingly, as a lot of heat is generated, a cooling fan is necessarily used to drive the heat down. However, the cooling fan is one of sources that generates noise. In addition, since the spectrum of the lamp light source 100 is widely distributed across the entire wavelengths, due to a narrow color gamut, a selection of color is limited, a color purity is inferior, and the life span is short, so that a stable use of the lamp light source 100 is not possible.

In the conventional projector, to realize a color image, the color wheel 105 is rotated by a driving motor (not shown) at a high speed so as to sequentially illuminate the R, G and B color light beams onto the display device 112. R, G and B color filters (not shown) are equally arranged on the entire surface of the color wheel 105. Where three colors are sequentially used one by one during a rotation of the color wheel 105 according to a response speed of the display device 112, ⅔ of the light are lost. Additionally, since a gap is formed between neighboring color filters, for a preferable generation of a color, loss of light occurs at the gap.

Since the color wheel 105 rotates at a high speed, noise from the rotation of the color wheel 105 is also generated. Also, the mechanical movement of the driving motor has an ill effect on stability of the color wheel 105. In addition, due to a mechanical limit in the driving motor, it is difficult to obtain a speed over a certain degree, and a color breakup phenomenon occurs. Furthermore, since a unit price of the color wheel 105 is very high, the manufacturing cost of the projection is also high.

SUMMARY OF THE INVENTION

Accordingly, it is an object of the present invention to provide an illumination system which forms a color image without a color wheel by using a light emitting device that emits a light beam having a predetermined wavelength so as to improve the color purity and color gamut, and a projector adopting the illumination system.

It is another object of the present invention to provide an illumination system having at least one holographic optical element or a diffraction optical device which minimizes a cross section of a light beam so as to reduce a loss and volume of light, and a projector adopting the illumination system.

Additional objects and advantages of the invention will be set forth in part in the description which follows and, in part, will be obvious from the description, or may be learned by practice of the invention.

To achieve the above and other objects of the present invention, there is provided an illumination system comprising an illumination unit including at least one light emitting device which emits a light beam having a predetermined wavelength and at least one holographic optical element which reduces a cross section of the light beam emitted from the light emitting device, and an optical path changer which changes a proceeding path of an incident light passing through the holographic optical element.

The light emitting device may be a light emitting device having an array structure.

The light emitting device may be one of a light emitting diode (LED), a laser diode (LD), an organic electro luminescent (EL), and a field emission display (FED).

The at least one holographic optical element may comprise a first holographic optical element which changes a proceeding direction of the light beam emitted from the light emitting device, and a second holographic optical element which reduces a diffraction angle of an incident light beam of which the proceeding direction is changed by the first holographic optical element. The at least one holographic optical element reduces a cross section of an incident light beam where the light beam is reflected by the optical path changer.

The first holographic optical element allows an incident light beam to be incident on the second holographic optical element at a predetermined angle of inclination and to be a parallel light beam.

The optical path changer may be a reflection minor.

The optical path changer may comprise a first optical path changer which changes the proceeding path of the incident light passing through the holographic optical element, and a second optical path changer which changes a proceeding path of the light beam passing through the first optical path changer by selectively transmitting or reflecting the light beam.

The at least one illumination unit may comprise a plurality of illumination units which emit light beams having different wavelengths, and are arranged in a line in a horizontal direction.

The second optical path changer may be a dichroic filter which filters or transmits a light beam passing through the first optical path changer according to a wavelength thereof.

The second optical path changer may be a cholesteric band modulation filter which reflects or transmits the light beam passing through the first optical path changer according to a polarization direction and a wavelength thereof.

The cholesteric band modulation filter may comprise a first mirror surface which reflects a light beam of a right circular polarization and transmits a light beam of a left circular polarization, with respect to a beam light having a predetermined wavelength, and a second mirror surface which transmits the light beam of the right circular polarization and reflects the light beam of the left circular polarization, with respect to the beam light having the predetermined wavelength.

The plurality of illumination units which emit light beams having different wavelengths can be arranged to be separated from one another at a predetermined angle.

The second optical path changer may be one of an X prism and an X type dichroic filter.

The illumination units may further be arranged in a multi-layer structure.

The illumination system having the plurality of light illumination units may further comprise a parallel light beam forming unit which produces a light beam emitted from a corresponding light emitting device or light emitting device array into a parallel light beam.

To achieve the above and other objects of the present invention, there is also provided an illumination system comprising at least one light emitting device or light emitting device array which emits a light beam having a wavelength, a first holographic optical element which condenses the light beam emitted from the light emitting device or light emitting device array, a second holographic optical element which produces an incident light beam passing through the first holographic optical element into a parallel light beam with a reduced cross section thereof, a third holographic optical element which reduces a diffraction angle of an incident light beam which is made into the parallel light beam by the second holographic optical element, and an optical path changer which changes a proceeding path of an incident light beam passing through the third holographic optical element.

The illumination system may comprise a plurality of light emitting devices or light emitting device arrays, wherein a third holographic optical element of a corresponding one of the light emitting devices or light emitting device arrays is disposed on a plane different from a plane of a neighboring third holographic optical element and does not prevent a proceeding path of a light beam from the neighboring third holographic optical element.

To achieve the above and other objects of the present invention, there is further provided an illumination system comprising at least one illumination unit having at least one light emitting device which emits a light beam having a predetermined wavelength and at least one diffractive optical device which reduces a cross section of the light beam emitted from the light emitting device, and an optical path changer which changes a proceeding path of an incident light beam input through the diffractive optical device.

To achieve the above and other objects of the present invention, there is provided a projector comprising at least one illumination unit including at least one light emitting device which emits a light beam having a predetermined wavelength and at least one holographic optical element which reduces a cross section of the light beam emitted from the light emitting device, an optical path changer which changes a proceeding path of an incident light input through the holographic optical element, a display device which processes an image signal of a light beam input from the optical path changer and forms an image thereof, and a projection lens unit which magnifies the image formed by the display device and projects the magnified image.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
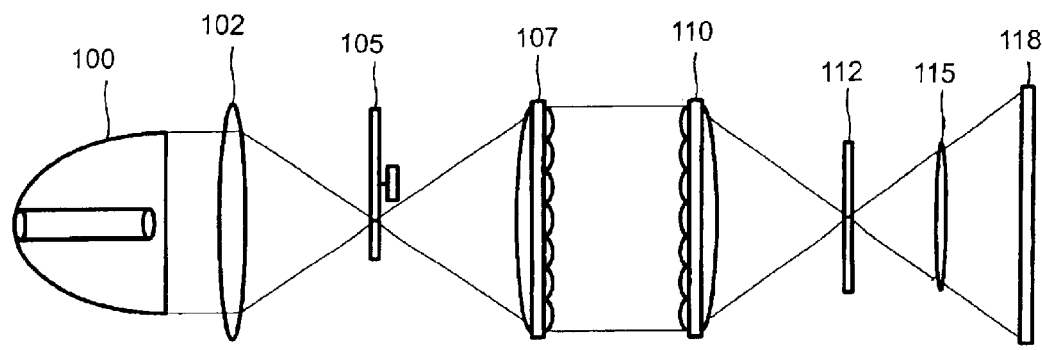
FIG. 1 is a side view illustrating the structure of a conventional projector.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
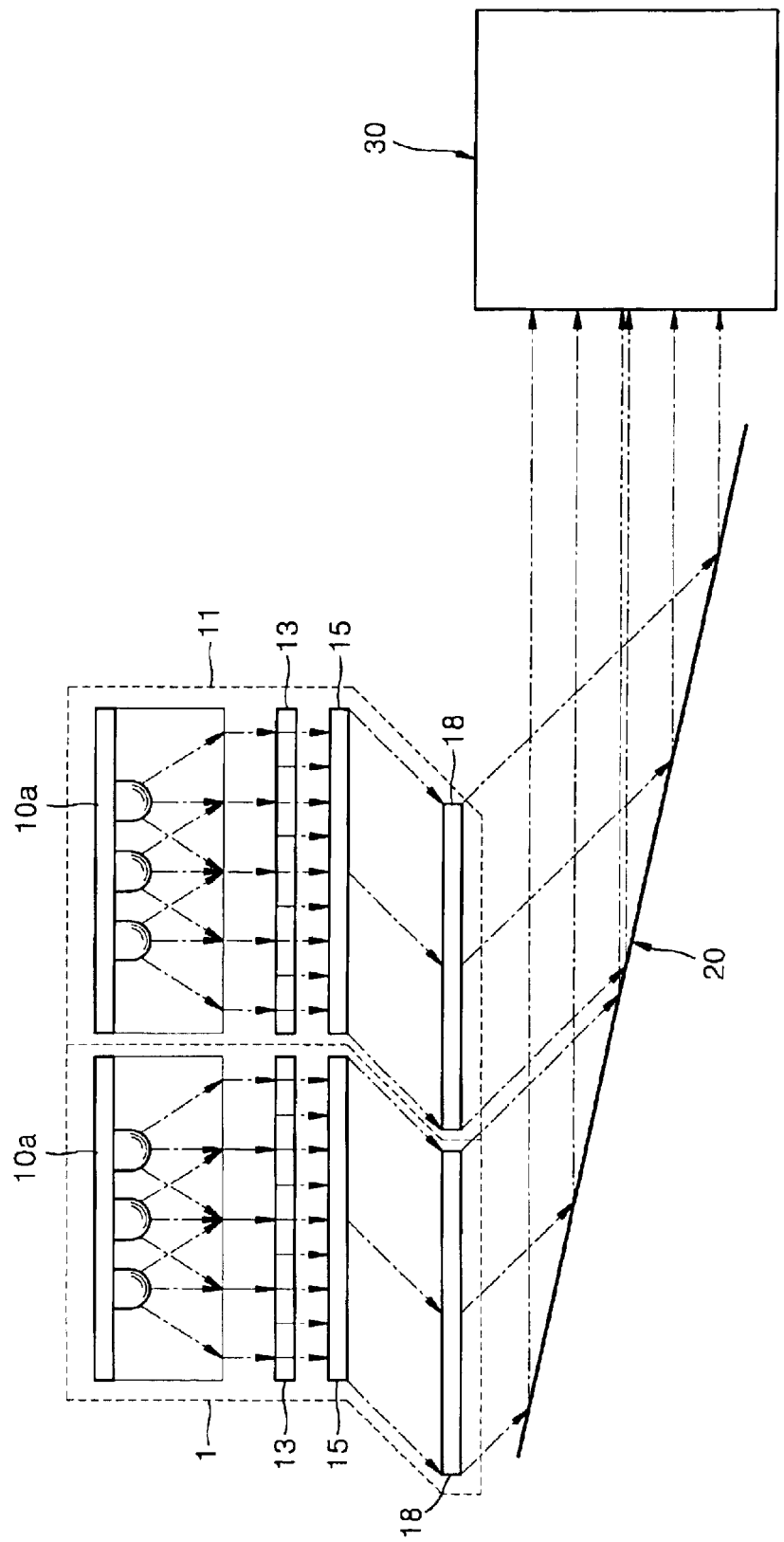
FIGS. 2 and 3 are side views illustrating the structures of an illumination system according to an embodiment of the present invention.
Figure 3:
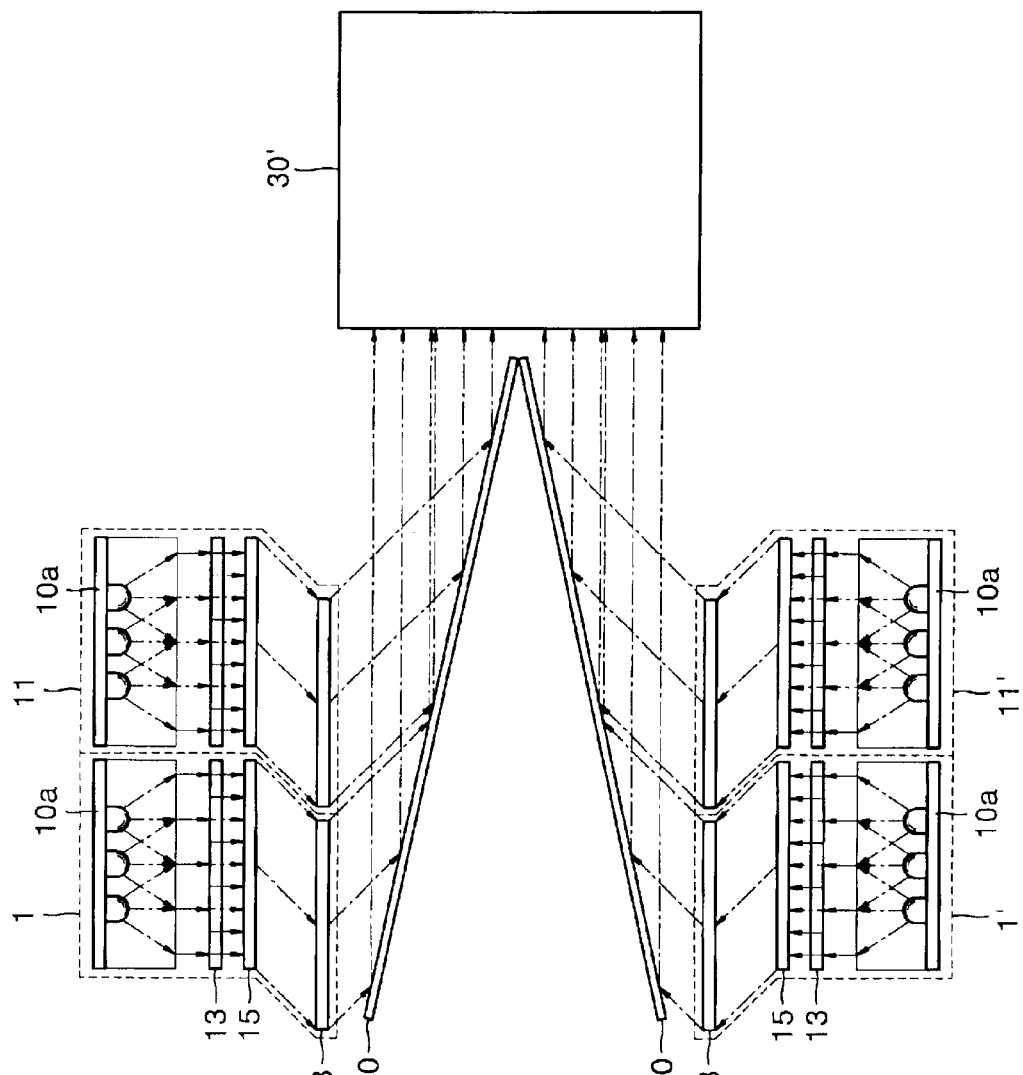
Figure 5:
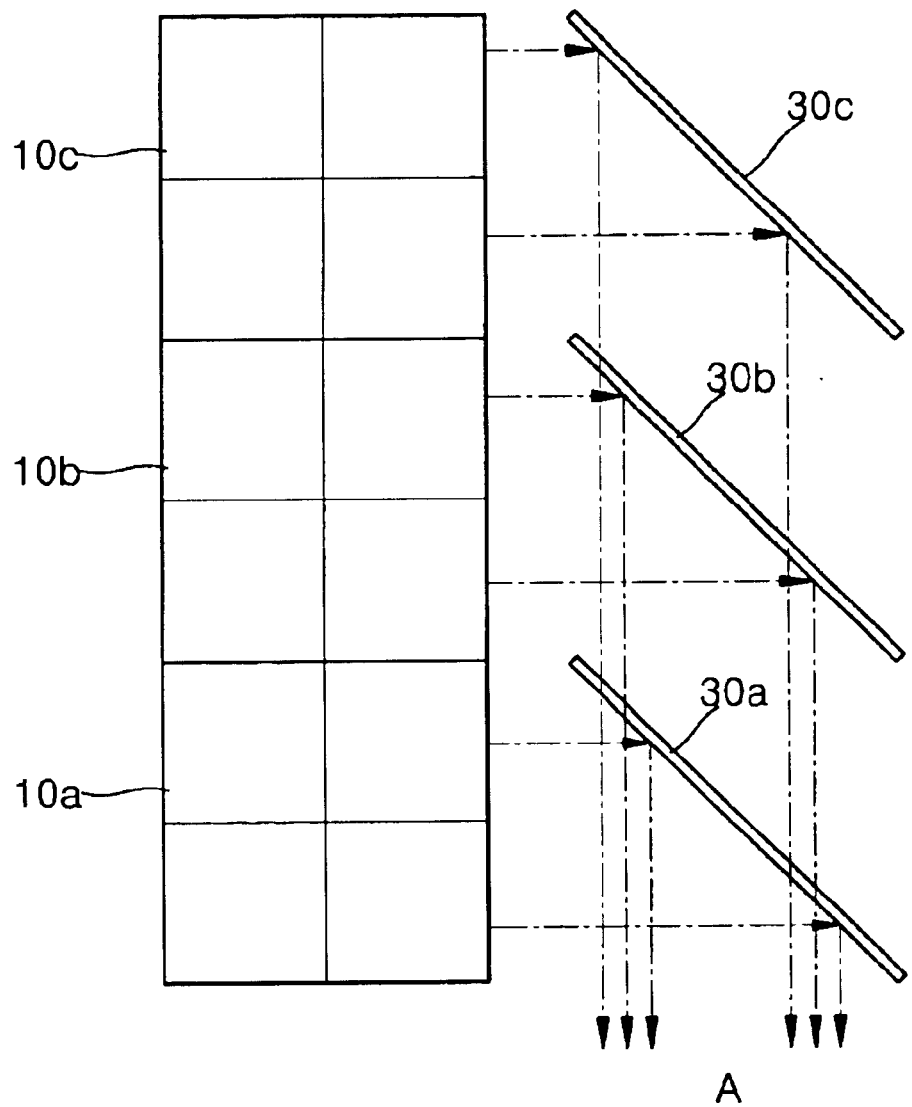
FIGS. 5 through 7 are views of optical path changers in illumination systems according to the present invention.

FIGS. 2, 3 and 5 show an illumination system according to an embodiment of the present invention. The illumination system includes at least one light emitting device 10a, as shown in FIG. 2, or 10a, 10b, and 10c, as shown in FIG. 5, which emits a light beam having a predetermined wavelength, illumination units 1 and 11 having at least one holographic optical element (described herein below) designed to reduce a cross section of a light beam emitted from a corresponding one of the light emitting devices 10a, or 10a 10b, and 10c, and a first optical path changer 20 which changes a proceeding path of an incident light passing through the holographic optical element.

A LED (light emitting diode), an LD (laser diode), an organic EL (electro luminescent), or an FED (field emission display) may be used as the light emitting devices 10a, 10b and 10c. The light emitting devices 10a, 10b and 10c can be arranged in an array. Also, the light emitting devices 10a of FIG. 2 or the light emitting device arrays 10a, 10b, and 10c of FIG. 5 can be formed to emit light beams having different wavelengths. For example, in FIG. 5, a first light emitting device 10a may emit a light beam having a red (R) wavelength, a second light emitting device 10b may emit a light beam having a green (G) wavelength, and a third. light emitting device 10c may emit a light beam having a blue (B) wavelength.

The holographic optical element may include a first holographic optical element 15 which makes each of the light beams emitted from the first through third light emitting devices or the light emitting device arrays 10a, 10b, and 10c to be inclined and parallel to one another, and a second holographic optical element 18 which diffracts incident light beams passing through the first holographic optical element 15 at a small angle. In general, a holographic optical element having a large diffraction angle is more difficult to manufacture and has a lower diffraction efficiency than a holographic optical element having a relatively small diffraction angle. Considering the above, a beam light is made to be incident on the second holographic optical element 18 with a direction thereof inclined by the first holographic optical element 15, to reduce a diffraction angle of the light beam diffracted by the second holographic element 18.

A proceeding path of the beam diffracted by the second holographic optical element 15 is changed by being reflected by the first optical path changer 20, for example, a reflection mirror 20. Here, as the diffraction angle of the beam diffracted by the second holographic optical element 18 increases, the cross section of the light beam reflected by the reflection mirror 20 is reduced. In contrast, as describe above, manufacturing a holographic optical element is difficult and the efficiency of diffraction is lowered as the diffraction angle increases. Accordingly, to solve the above problems, the light beam incident on the second holographic optical element 18 is made to be appropriately inclined by using the first holographic optical element 15. Although two holographic optical elements, that is, the first and second holographic optical elements 15 and 18 are embodied in FIG. 2, it is understood that two or more holographic optical elements can be appropriately arranged to reduce the cross section of the light beam.

The illumination system may further include a parallel light beam forming unit 13, for example, a collimating lens array or a Fresnel lens array, which makes light beams emitted from the corresponding light emitting devices 10a, or the light emitting device arrays 10a, 10b, and 10c parallel to one another, and a second optical path changer 30 which secondarily changes an optical path of the light beams with its optical path changed by the first optical path changer 20, so as to have the light beams proceed along a desired optical path thereof.

One or more illumination units 1 and 11 having the above structure can be provided for each of R, G, and B wavelengths. That is, to secure a sufficient amount of light, a plurality of the illumination units 1 and 11 which emit light beams having R, G, and B wavelengths can be provided. The illumination units 1 and 11 can be arranged horizontally in a line, as shown in FIG. 2.

As shown in FIG. 3, illumination units 1, 1', 11, and 11' can be arranged vertically in a multi-layer structure. The illumination units 1, 1', 11, and 11' in a multi-layer structure can be arranged symmetrically to face each other. These horizontal or multi-layer structures may be formed equally by each illumination unit corresponding to each wavelength. Here, since the elements having the same reference numeral as those in shown in FIG. 2 have the same functions, detailed descriptions thereof will be omitted to avoid repetition. Reference numeral 30' denotes a second optical path changer which is arranged to be used in common by light beams emitted from upper illumination units 1 and 11 and lower illumination units 1' and 11' in the multi-layer structure.

Figure 4:
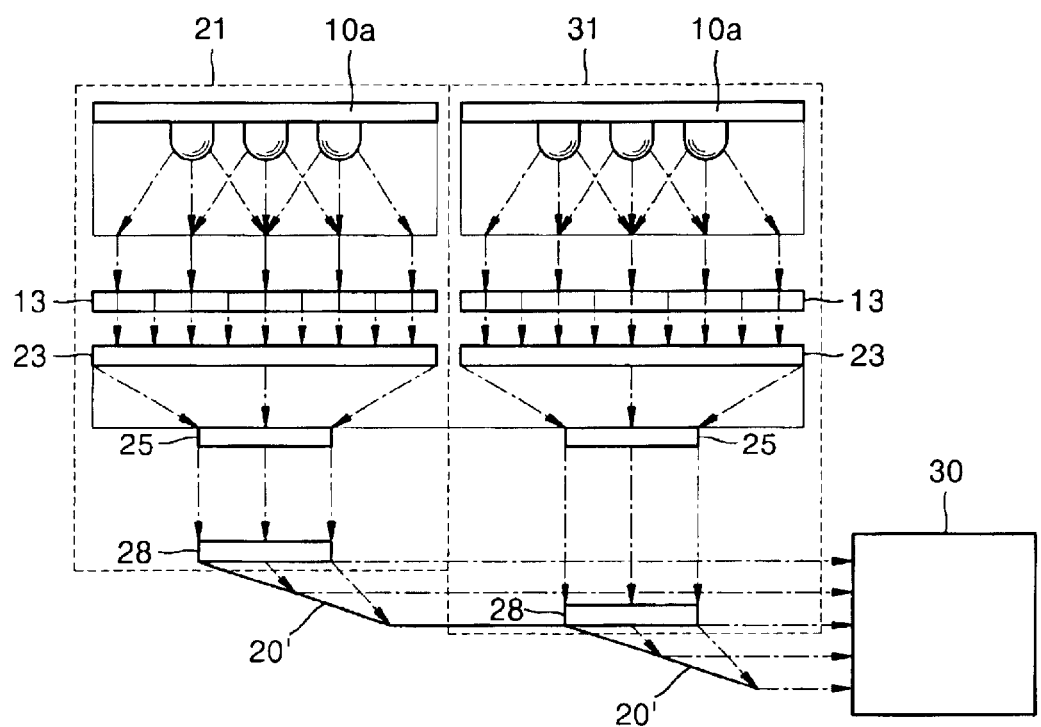
FIG. 4 is a side view illustrating the structure of an illumination system according to another embodiment of the present invention.

FIG. 4 and FIG. 5, in view of FIG. 4, show an illuminating system having illumination units 21 and 31 according to another embodiment of the present invention. Each of the illumination units 21 and 3 include a first hologram optical element 23 which condenses a light beam emitted from a corresponding one of light emitting devices 10a or the light emitting device arrays 10a, 10b, and 10c, a second holographic optical element 25 which produces the light beam emitted from the first holographic optical element 23 into a parallel light beam, and a third holographic optical element 28 which diffracts the light beam emitted from the second holographic optical element 25 to reduce a cross section of the light beam. Reference numeral 20' denotes a first optical path changer which changes a proceeding path of an incident light. The remaining elements having the same reference numerals perform the same functions as the elements shown in FIG. 2.

Where the light beam is condensed by the first hologram optical element 23 and made into a parallel light beam by the second holographic optical element 25, the cross section of the parallel light beam is reduced compared to a cross section of a light beam emitted from the light emitting devices 10a or light emitting device arrays 10a, 10b, and 10c, as shown in FIG. 2 or FIG. 5 in view of FIG. 2. As the primarily compressed light beam is diffracted by the third holographic optical element 28 and reflected by the first optical path changer 20', the light beam proceeds with its cross section further being reduced.

The illumination units 21 and 31 having the light emitting devices 10a or light emitting device arrays 10a, 10b and 10c, and the first through third holographic optical elements 23, 25, and 28 can be arranged in multiple numbers in a horizontal direction. For example, as shown in FIG. 4, where the illumination units 21 and 31 are arranged horizontally parallel to each other, a corresponding one of the third holographic optical elements 28 is arranged on a plane different from a plane where a neighboring third holographic optical element is located, so as not to be hindered by a light beam from the neighboring third holographic optical element. That is, the third holographic optical element 28 included in the illumination unit 21 is arranged on a plane different from a plane where the third holographic optical element 28 included in the illumination unit 31 is arranged, so as not to hinder a proceeding path of the light beam emitted from the illumination unit 31. Accordingly, the first optical path changers 20' are independently arranged corresponding to the respective illumination units 21 and 31.

In addition to the above arrangement, the illumination units 21 and 31 can be arranged vertically in a multi-layer structure, as can be seen in FIG. 3 for an aspect of the embodiment of FIG. 2. Where the illumination units 21 and 31 are arranged in the multi-layer structure, the illumination units 21 and 31 can be arranged symmetrically to face each other.

A parallel light beam forming unit 13, such as a collimating lens array or a Fresnel lens array, which makes a light beam emitted from a corresponding one of the light emitting devices 10a or the light emitting device arrays 10a. 10b, and 10c (see FIG. 5) into a parallel light beam, can further be provided between the corresponding one of the light emitting devices 10a or the light emitting device arrays 10a. 10b, and 10c, and the corresponding first holographic optical element 23. The first optical path changers 20' change a proceeding path of an incident light having a cross section reduced by the first through third holographic optical elements 23, 25, and 28. For example, a reflection mirror can be used as the parallel light beam forming unit 13.

The second optical path changers 30 and 30', described above may selectively transmit or reflect an incident light beam to make a light beam input along different optical paths proceed along the same optical path. Each of the second optical path changers 30 and 30', as shown in FIG. 5, can be formed of first, second and third dichroic filters 30a, 30b, and 30c which can reflect or transmit a light beam from a corresponding one of the light emitting devices 10a or the light emitting device arrays 10a, 10b, and 10c according to a wavelength thereof. For example, the first light emitting device or light emitting device array 10a can emit a light beam having an R wavelength, the second light emitting device or light emitting device array 10b can emit a light beam having a G wavelength, and the third light emitting device or light emitting device array 10c can emit a light beam having a B wavelength.

The first dichroic filter 30a reflects only the R light beam and transmits the other G and B light beams. The second dichroic filter 30b reflects only the G light beam and transmits the other R and B light beams. The third dichroic filter 30c reflects only the B light beam and transmits the other R and G light beams. Thus, where the R light beam is incident on the first dichroic filter 30a via the illumination units 1, 11, 21, and 31, and the first optical path changers 20 and 20', the R light beam is reflected in a direction indicated by arrows A in FIG. 5. Thus, the R, G, and B color light beams having different optical paths proceed along the same path.

Figure 6:
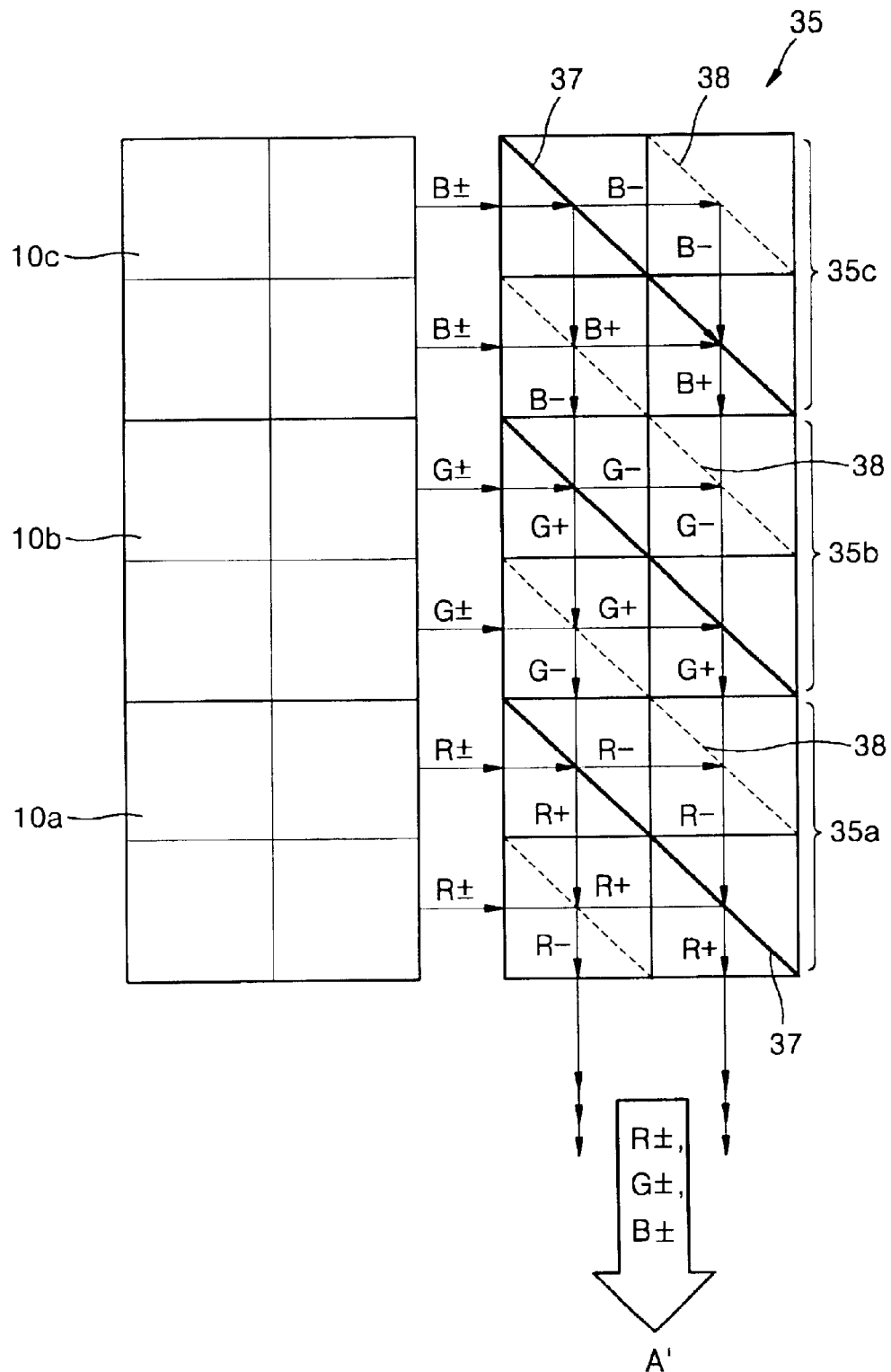

FIG. 6 shows that a cholesteric band modulation filter 35 which selectively reflects or transmits an incident light beam according to a polarization direction thereof can be used as the second optical path changer 30 or 30'. The cholesteric band modulation filter 35 can change an optical path of a light beam having a predetermined wavelength, for example, by reflecting a light beam of a right circular polarization and transmitting a light beam of a left circular polarization, or by transmitting a light beam of a right circular polarization and reflecting a light beam of a left circular polarization. The cholesteric band modulation filter 35 can be formed of first, second, and third cholesteric band modulation filters 35a, 35b, and 35c which selectively transmit or reflect a light beam having an R wavelength, a light beam having a G wavelength, and a light beam having a B wavelength, according to a direction of a circular polarization.

To improve the efficiency of light by using both a light beam of a right circular polarization and a light beam of a left circular polarization, a first mirror surface 37 which reflects a light beam of a right circular polarization and transmits a light beam of a left circular polarization with respect to a wavelength corresponding to each filter, and a second mirror surface 38 which transmits a light beam of a right circular polarization and reflects a light beam of a left circular polarization, are appropriately arranged in each of the first, second, and third cholesteric band modulation filters 35a, 35b, and 35c. Here, the light beam of the right circular polarization is indicated by + and the light beam of the left circular polarization is indicated by −. For example, R+ denotes an R light beam of a right circular polarization and R− denotes an R light beam of a left circular polarization.

The R, G, and B light beams passing through the illumination units 1, 11, 21, and 31, and reflected by the first optical path changers 20 and 20' proceed toward the first, second, and third cholesteric band modulation filters 35a, 35b, and 35c. The first, second, and third cholesteric band modulation filters 35a, 35b, and 35c include the first and second mirror surfaces 37 and 38 in a diagonal direction with respect to the direction in which the light beam is input. Here, for example, in a proceeding path of the R light beam, where a light beam of a right circular polarization (R+) of the R light beam reflected by the first optical path changers 20 or 20' first meets the first mirror surface 37, the R+ light beam is reflected by the first mirror surface 37. Then, when meeting the second mirror surface 38 on a proceeding path thereof, the R+ light beam passes through the second mirror surface 38 and proceeds in a direction A'. Meanwhile, where the R+ light beam first meets the second mirror surface 38, the R+ light beam is transmitted by the second mirror surface 38. Then, the R+ light beam is reflected by the first mirror surface 37 and proceeds in the direction A'.

Where a light beam of a left circular polarization (R−) of the R light beam reflected by the first optical path changers 20 or 20' first meets the first mirror surface 37, the R− light beam is transmitted by the first mirror surface 37. Then, when meeting the second mirror surface 38 on a proceeding path thereof, the R− light beam is reflected and proceeds in the direction A'. Meanwhile, where the R− light beam first meets the second mirror surface 38, the R− light beam is reflected by the second mirror surface 38 and proceeds in the direction A'.

The above operations are equally applied to G light beams of right and left circular polarizations (G+) and (G−), and B light beams of right and left circular polarizations (B+) and (B−), so as to have the light beams proceed in the same direction A'. The first, second, and third cholesteric band modulation filters 35a, 35b, and 35c selectively transmit or reflect a light beam having a corresponding wavelength, and transmit all light beams having different wavelengths regardless of the polarization direction. Thus, since both the light beams of a right circular polarization and a left circular polarization can be used effectively, the efficiency of light is improved.

Figure 7:
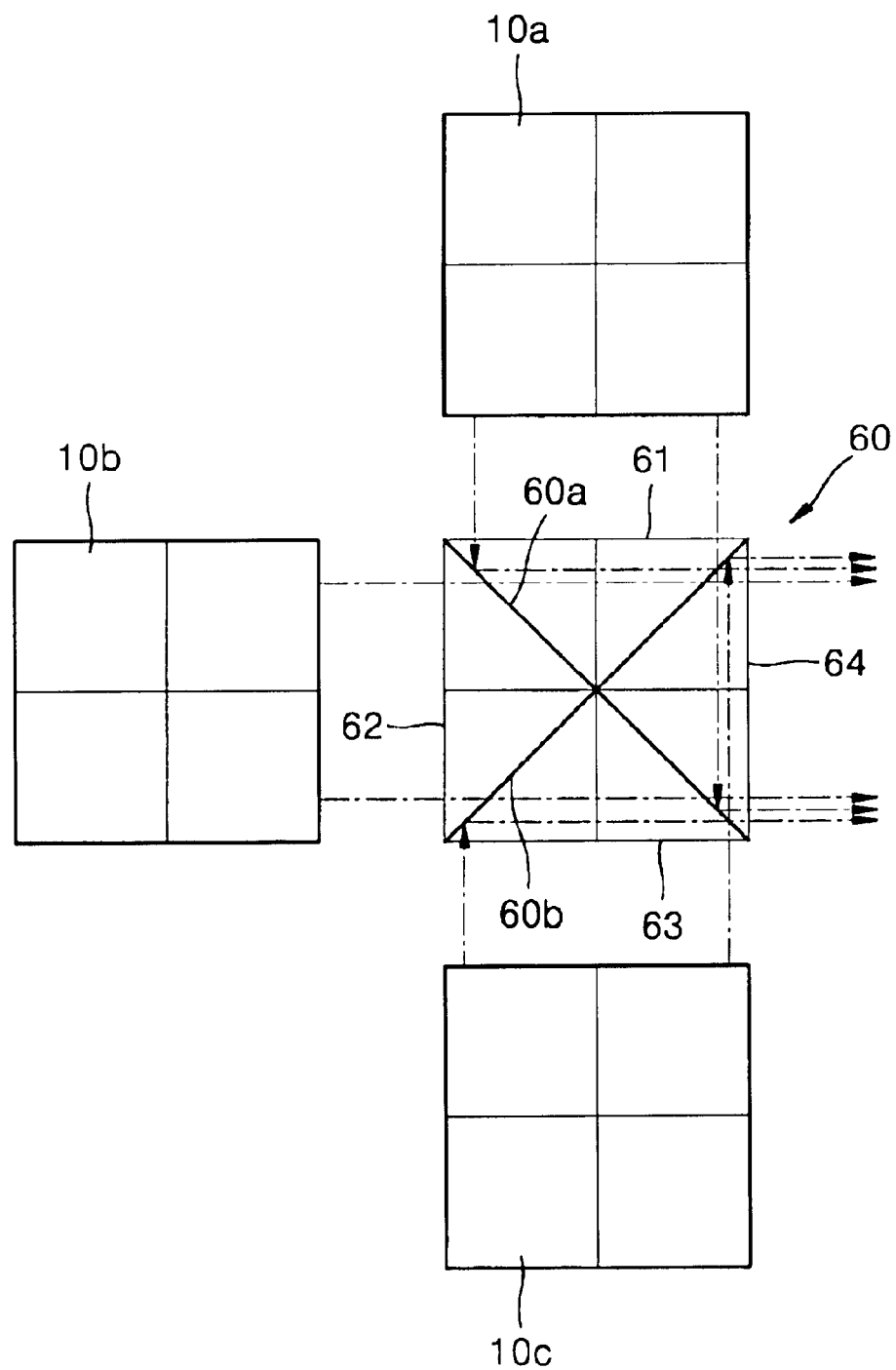

FIG. 7 shows that the second optical path changer 30 or 30' can be formed of an X prism 60 or an X type dichroic filter film. Here, the light emitting devices 10a or the light emitting device arrays 10a. 10b, and 10c are arranged to be radially separated at a predetermined angle with respect to the X prism 60 or the X type dichroic filter film. The X prism 60 includes first, second, and third incident surfaces 61, 62, and 63 disposed, for example, to face the illumination units 1 and 11 corresponding to each of R, G, and B colors, and a single exit surface 64. The X prism 60 further includes third and fourth mirror surfaces 60a and 60b which are arranged to cross each other like a letter X to selectively transmit or reflect an incident light according to a wavelength thereof. For example, the third mirror surface 60a reflects a R light beam while transmitting G and B light beams having different wavelengths. The fourth mirror surface 60b reflects the B light beam while transmitting the R and G light beams having the different wavelengths.

The R, G, and B color light beams emitted from the light emitting devices 10a or the light emitting device arrays 10a. 10b, and 10c, passing through at least one holographic optical elements 15 and 18, or 23, 25, and 28, and reflected by the first optical path changers 20 or 20' are incident on the first through third incident surfaces 61, 62, and 63 of the X prism 60 corresponding thereto. The incident R, G, and B color light beams pass through or are reflected by the third and fourth mirror surfaces 60a and 60b, and exit through the exit surface 64 to proceed in the same direction.

As described above, the illumination units 1, 11, 21, and 31 can be arranged in various ways, and one of the second optical path changers 30 35, and 60 that is suitable for the arrangement can be selected and provided. Also, at least one holographic optical element described above can be replaced by at least one diffractive optical element having the same function.

Figure 8:
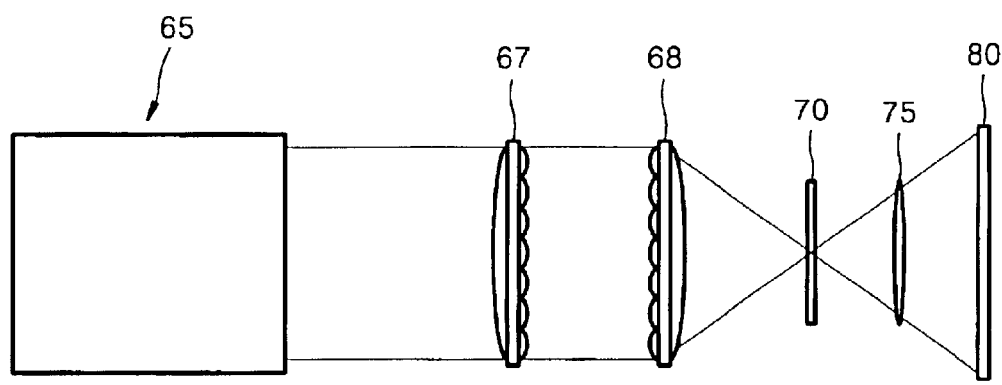
FIG. 8 is a side view illustrating the structure of a projector adopting an illumination system according to the present invention.

FIG. 8 shows a projector which adopts an illumination system according to the present invention. The projector includes an illumination system 65 which emits a light beam, a display device 70 which forms an image by using R, G, and B color light beams emitted from the illumination system 65, and a projection lens unit 75 which allows the image formed by the display device 70 to proceed toward a screen 80. The illumination system 65 comprises an illumination unit and an optical path changer. The illumination unit includes at least one light emitting device which emits a light beam having a predetermined wavelength and at least one holographic optical element which reduces a profile of the light beam emitted from the light emitting device. The optical path changer changes a proceeding path of an incident light beam input through the holographic optical element.

That is, one of the illumination systems described with reference to FIGS. 2 through 7 is indicated by a reference numeral 65 in FIG. 8. An LED (light emitting diode), an LD (laser diode), an organic EL (electro luminescent), or FED (field emission display) can be used as the light emitting devices 10a or light emitting device arrays 10a, 10b, and 10c, as shown in FIGS. 2–7. The light emitting devices 10a or the light emitting device arrays 10a, 10b, and 10c emit R, G, and B color light beams. Also, one or more illumination units 1 and 11 having the same structure as shown in FIGS. 2–7 may be provided further in a horizontal or vertical direction to secure a sufficient amount of light.

Holographic optical elements 15 and 18, or 23, 25, and 28 of FIGS. 2–7 can be replaced by a diffractive optical device having the same function.

Where the first through third light emitting devices or the light emitting device arrays 10a, 10b, and 10c are arranged in a line, all R, G, and B color light beams passing through the holographic optical elements 15 and 18 or 23, 25, and 28, and reflected by the first optical path changer 20 or 20' are output in the same direction and parallel to one another.

A second optical path changer can be provided, which may be formed of the first through third dichroic filters 30a, 30b, and 30c to change a proceeding path of the R, G, and B color light beams by selectively transmitting or reflecting the light beams according to a wavelength of an incident light beam thereof.

The projection further includes a fly eye lens 67 which uniformly distributes the R, G, and B color light beams proceeding in the same direction via the first through third dichroic filters 30a, 30b, and 30c, and a relay lens 68 which condenses the light beam toward the display device 70. Accordingly, a color image is formed by the display device 70 using the R, G, and B light beams. The display device 70 may be a mobile mirror apparatus which realizes a color image by on/off switching operations of micromirrors according to an image signal, or an LCD device which realizes a color image by polarizing and modulating an incident light beam.

Although the first through third dichroic filters 30a, 30b, and 30c are used as the second optical path changer for the projector shown in FIG. 8, other optical path changers including the cholesteric band modulation filter 35 which transmit or reflect an incident light beam according to a wavelength and a circular polarization of a light beam can be used.

Also, an X prism 60 or an X type dichroic filter, which changes an optical path of the R, G, and B color light beams input from different directions to proceed in the same direction by reflecting or transmitting an incident light beam according to a wavelength thereof, can be used as the second optical path changer. Here, the first through third light emitting devices or the light emitting device arrays 10a, 10b, and 10c which emit R, G, and B color light beams are arranged to be separated radially at a predetermined angle with respect to the X prism 60 or the X type dichroic filter, as shown in FIG. 7. Accordingly, an illumination system having the above structure can replace an illumination system having the first through third light emitting devices or the light emitting device arrays 10a, 10b, and 10c and the dichroic filters 30a, 30b, and 30c.

The R, G, and B color light beams emitted from the illumination system 65 are incident on the display device 70 after passing through the fly eye lens 67 and the relay lens 68, to form a color image. The color image is magnified by the projection lens unit 75 and then formed on the screen 80.

As described above, in an illumination system according to the present invention, a color purity of an image is improved by using a light emitting device or a light emitting device array which emits a light beam having a narrow spectrum of a desired wavelength band. Also, in the present invention, a color gamut having a wider distribution can be secured and a cross section of a light beam emitted from a holographic optical element or a diffractive optical device is minimized, so as to make the illumination system compact and reduce loss of light. Additionally, in the present illumination system, less heat is generated and the life span is extended as compared to a conventional lamp light source.

Furthermore, in a projector adopting an illumination system according to the present invention, a color wheel is not needed as a time sequential driving by the illumination system having a light emitting device is possible. Since an on/off switching operation is faster than a rotation speed of the color wheel, a high frame rate can be realized and power consumption can be reduced. Thus, the projector adopting the illumination system according to the present invention can provide an image having an improved resolution and quality.

Although a few embodiments of the present invention have been shown and described, it will be appreciated by those skilled in the art that changes may be made in these embodiments without departing from the principles and spirit of the Invention, the scope of which is defined in the appended claims and their equivalents.

What is claimed is:

1. An illumination system comprising:
   an illumination unit which includes:
      at least one light emitting device which emits a light beam having a predetermined wavelength, and
      at least one holographic optical element which reduces a cross section of the light beam emitted from the light emitting device; and
   an optical path changer which changes a proceeding path of an incident light passing through the holographic optical element.

2. The illumination system as claimed in claim 1, wherein the light emitting device includes a light emitting device having an array structure.

3. The illumination system as claimed in claim 2, wherein the light emitting device is one of a light emitting diode (LED), a laser diode (LD), an organic electro luminescent (EL), and a field emission display (FED).

4. The illumination system as claimed in claim 3, wherein:
   the at least one holographic optical element comprises:
      a first holographic optical element which changes a proceeding direction of the light beam emitted from the light emitting device; and
      a second holographic optical element which reduces a diffraction angle of an incident light beam of which the proceeding direction is changed by the first holographic optical element, and
   the at least one holographic optical element reduces a cross section of an incident light beam where the light beam is reflected by the optical path changer.

5. The illumination system as claimed in claim 4, wherein the first holographic optical element allows an incident light beam to be incident on the second holographic optical element at a predetermined angle of inclination and to be a parallel light beam.

6. The illumination system as claimed in claim 5, wherein the optical path changer is a reflection mirror.

7. The illumination system as claimed in claim 5, wherein the optical path changer comprises:

a first optical path changer which changes the proceeding path of the incident light passing through the holographic optical element; and a second optical path changer which changes a proceeding path of the light beam passing through the first optical path changer by selectively transmitting or reflecting the light beam.

8. The illumination system as claimed in claim 7, wherein:

the illumination unit comprises a plurality of illumination units which emit light beams having different wavelengths, and the illumination units are arranged in a line in a horizontal direction.

9. The illumination system as claimed in claim 8, wherein the second optical path changer is a dichroic filter which reflects or transmits a light beam passing through the first optical path changer according to a wavelength thereof.

10. The illumination system as claimed in claim 8, wherein the illumination units are further arranged in a multi-layer structure.

11. The illumination system as claimed in claim 7, wherein the second optical path changer is a cholesteric band modulation filter which reflects or transmits the light beam passing through the first optical path changer according to a polarization direction and a wavelength thereof.

12. The illumination system as claimed in claim 11, wherein the cholesteric band modulation filter comprises:

a first mirror surface which reflects a light beam of a right circular polarization and transmits a light beam of a left circular polarization, with respect to a beam light having a predetermined wavelength; and a second mirror surface which transmits the light beam of the right circular polarization and reflects the light beam of the left circular polarization, with respect to the beam light having the predetermined wavelength.

13. The illumination system as claimed in claim 7, wherein:

the illumination unit comprises a plurality of illumination units which emit light beams having different wavelengths, and the illumination units are arranged to be separated from one another at a predetermined angle.

14. The illumination system as claimed in claim 13, wherein the second optical path changer is one of an X prism and an X type dichroic filter.

15. The illumination system as claimed in claim 13, wherein the illumination units are further arranged in a multi-layer structure.

16. The illumination system as claimed in claim 13, further comprising a parallel light beam forming unit which produces a light beam emitted from a corresponding light emitting device or light emitting device array into a parallel light beam.

17. The illumination system as claimed in claim 16, wherein the parallel light beam forming unit is one of a collimating lens array and a Fresnel lens array.

18. An illumination system comprising:

at least one light emitting device or light emitting device array which emits a light beam having a wavelength;

a first holographic optical element which condenses the light beam emitted from the light emitting device or light emitting device array;

a second holographic optical element which produces an incident light beam passing through the first holographic optical element into a parallel light beam with a reduced cross section thereof;

a third holographic optical element which reduces a diffraction angle of an incident light beam which is made into the parallel light beam by the second holographic optical element; and an optical path changer which changes a proceeding path of an incident light beam passing through the third holographic optical element.

19. The illumination system as claimed in claim 18, wherein the light emitting device or light emitting device array is one of a light emitting diode (LED), a laser diode (LD), an organic electro luminescent (EL), and a field emission display (FED).

20. The illumination system as claimed in claim 19, wherein the optical path changer is a reflection mirror.

21. The illumination system as claimed in claim 19, wherein the optical path changer comprises:

a first optical path changer which changes the proceeding path of the incident light passing through the third holographic optical element; and a second optical path changer which changes a proceeding path of the light beam passing through the first optical path changer by selectively transmitting or reflecting the light beam.

22. The illumination system as claimed in claim 21, wherein:

the at least one light emitting device or light emitting device array comprises a plurality of light emitting devices or light emitting device arrays which emit light beams having different wavelengths, and the light emitting devices or light emitting device arrays are arranged in a line in a horizontal direction.

23. The illumination system as claimed in claim 22, wherein the second optical path changer is a dichroic filter which reflects or transmits a light beam passing through the first optical path changer according to a wavelength thereof.

24. The illumination system as claimed in claim 22, wherein the second optical path changer is a cholesteric band modulation filter which reflects or transmits a light beam passing through the first optical path changer according to a polarization direction and a wavelength thereof.

25. The illumination system as claimed in claim 22, wherein the cholesteric band modulation filter comprises:

a first mirror surface which reflects a light beam of a right circular polarization and transmits a light beam of a left circular polarization, with respect to a beam light having a predetermined wavelength; and a second mirror surface which transmits the light beam of the right circular polarization and reflects the light beam of the left circular polarization, with respect to the beam light having the predetermined wavelength.

26. The illumination system as claimed in claim 22, wherein the light emitting devices or light emitting device arrays, the first through third holographic optical elements, and the first optical path changer are further arranged in a multi-layer structure so as to secure a sufficient amount of light.

27. The illumination system as claimed in claim 26, wherein the light emitting devices or light emitting device arrays, the first through third holographic optical elements, and the first optical path changer are further arranged in a multi-layer structure so as to secure a sufficient amount of light.

28. The illumination system as claimed in claim 27, wherein the multi-layer structure is in a symmetrical structure so as to have one or more of the light emitting devices or light emitting device arrays face each other.

29. The illumination system as claimed in claim 21, wherein:
the at least one light emitting device or light emitting device array comprises a plurality of light emitting devices or light emitting device arrays which emit light beams having different wavelengths, and
the light emitting devices or light emitting device arrays are arranged to be separated from one another at a predetermined angle.

30. The illumination system as claimed in claim 29, wherein the second optical path changer is one of an X prism and an X type dichroic filter.

31. The illumination system as claimed in claim 29, further comprising a parallel light beam forming unit which makes a light beam emitted from a corresponding one of the light emitting devices or light emitting device arrays into a parallel light beam.

32. The illumination system as claimed in claim 29, wherein a third holographic optical element of a corresponding one of the light emitting devices or light emitting device arrays is disposed on a plane different from a plane of a neighboring third holographic optical element and does not prevent a proceeding path of a light beam from the neighboring third holographic optical element.

33. The illumination system as claimed in claim 19, further comprising a parallel light beam forming unit which produces the light beam emitted from the light emitting device or light emitting device array into a parallel light beam.

34. The illumination system as claimed in claim 33, wherein the parallel light beam forming unit is one of a collimating lens array and a Fresnel lens array.

35. A projector comprising:
at least one illumination unit which includes:
at least one light emitting device which emits a light beam having a predetermined wavelength, and
at least one holographic optical element which reduces a cross section of the light beam emitted from the light emitting device;
an optical path changer which changes a proceeding path of an incident light input through the holographic optical element;
a display device which processes an image signal of a light beam input from the optical path changer and forms an image thereof; and
a projection lens unit which magnifies the image formed by the display device and projects the magnified image.

36. The projector as claimed in claim 35, wherein the light emitting device includes a light emitting device having an array structure.

37. The projector as claimed in claim 36, wherein the light emitting device is one of a light emitting diode (LED), a laser diode (LD), an organic electro luminescent (EL), and a field emission display (FED).

38. The projector as claimed in claim 37, wherein:
the at least one holographic optical element comprises:
a first holographic optical element which changes a proceeding direction of the light beam emitted from the light emitting device; and
a second holographic optical element which reduces a diffraction angle of an incident light beam of which the proceeding direction is changed by the first holographic optical element, and
the at least one holographic optical element reduces a cross section of an incident light beam where the light beam is reflected by the optical path changer.

39. The projector as claimed in claim 38, wherein the first holographic optical element allows an incident light beam to be incident on the second holographic optical element at a predetermined angle of inclination and to be a parallel light beam.

40. The projector as claimed in claim 38, wherein the at least one holographic optical element further comprises:
a third holographic optical element which condenses the light beam emitted from the light emitting device;
a fourth holographic optical element which produces the incident light beam passing through the third holographic optical element into a parallel light beam with a reduced cross section thereof; and
a fifth holographic optical element which reduces a diffraction angle of the incident light beam which is made parallel by the fourth holographic optical element.

41. The projector as claimed in claim 40, wherein the optical path changer is a reflection mirror.

42. The projector as claimed in claim 40, wherein the optical path changer comprises:
a first optical path changer which changes the proceeding path of the incident light input through the holographic optical element; and
a second optical path changer which changes a proceeding path of the light beam passing through the first optical path changer by selectively transmitting or reflecting the light beam.

43. The projector as claimed in claim 42, wherein:
the at least one illumination unit comprises a plurality of illumination units which emit light beams having different wavelengths, and
the illumination units are arranged in a line in a horizontal direction.

44. The projector as claimed in claim 43, wherein a fifth holographic optical element of a corresponding one of the illumination units is disposed on a plane different from a plane of a neighboring fifth holographic optical element and does not prevent a proceeding path of a light beam from the neighboring fifth holographic optical element.

45. The projector as claimed in claim 43, wherein the second optical path changer is a dichroic filter which reflect or transmits a light beam passing through the first optical path changer according to a wavelength thereof.

46. The projector as claimed in claim 43, wherein the second optical path changer is a cholesteric band modulation filter which reflects or transmits a light beam passing through the first optical path changer according to a polarization direction and a wavelength thereof.

47. The projector as claimed in claim 46, wherein the cholesteric band modulation filter comprises:
a first mirror surface which reflects a light beam of a right circular polarization and transmits a light beam of left circular polarization, with respect to a beam light having a predetermined wavelength; and
a second mirror surface which transmits the light beam of the right circular polarization and reflects the light beam of the left circular polarization, with respect to the beam light having the predetermined wavelength.

48. The projector as claimed in claim 42, wherein:
the at least one illumination unit comprises a plurality of illumination units which emit light beams having different wavelengths, and
the illumination units are arranged to be separated from one another at a predetermined angle.

49. The projector as claimed in claim 48, wherein the second optical path changer is one of an X prism and an X type dichroic filter.

50. The projector as claimed in claim 48, wherein the illumination units are further arranged in a multi-layer structure.

51. The projector as claimed in claim 48, further comprising a parallel light beam forming unit which makes a light beam emitted from a corresponding one of the light emitting devices or light emitting device arrays into a parallel light beam.

52. The projector as claimed in claim 51, wherein the parallel light beam forming unit is one of a collimating lens array and a Fresnel lens array.

53. The projector as claimed in claim 35, further comprising:
- a fly eye lens which uniformly distributes light beams proceeding in the same direction through the optical path changer; and
- a relay lens which condenses the light beams toward the display device.

54. The projector as claimed in claim 35, wherein the display device is a mobile mirror apparatus which includes one or more micromirrors, and realizes the image by on/off switching operations of the one or more micromirrors according to the image signal.

55. The projector as claimed in claim 35, wherein the display device is an LCD device which realizes the image by polarizing and modulating an incident light beam.

56. An illumination system comprising:
- at least one illumination unit which includes:
  - at least one light emitting device which emits a light beam having a predetermined wavelength, and
  - at least one diffractive optical device which reduces a cross section of the light beam emitted from the light emitting device; and
  - an optical path changer which changes a proceeding path of an incident light beam input through the diffractive optical device.

57. The illumination system as claimed in claim 56, wherein the light emitting device includes a light emitting device having an array structure.

58. The illumination system as claimed in claim 57, wherein the light emitting device is one of a light emitting diode (LED), a laser diode (LD), an organic electro luminescent (EL), and a field emission display (FED).

59. The illumination system as claimed in claim 58, wherein the at least one diffractive optical device comprises:
- a first diffractive optical device which changes a proceeding direction of the light beam emitted from the light emitting device; and
- a second diffractive optical device which reduces a diffraction angle of an incident light beam, of which the proceeding direction is changed by the first diffractive optical device, so as to reduce a cross section of an incident light beam where the light beam is reflected by the first optical path changer.

60. The illumination system as claimed in claim 58, wherein the at least one diffractive optical device comprises:
- a first diffractive optical device which condenses the light beam emitted from the light emitting device;
- a second diffractive optical device which produces an incident light beam passing through the third diffractive optical device into a parallel light beam with a reduced cross section thereof; and
- a third diffractive optical device which reduces a diffraction angle of an incident light beam which is made parallel by the second diffractive optical device.

* * * * *